July 28, 1959
D. FINCH
2,897,318
THERMOSTATIC SWITCH
Filed July 16, 1956
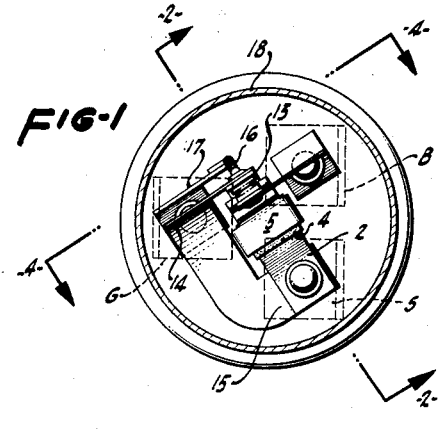
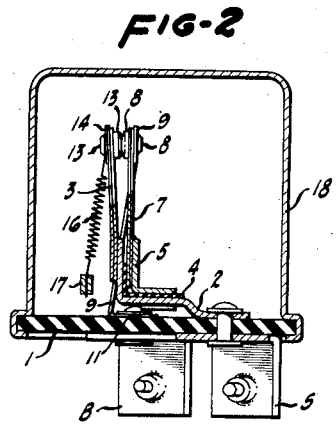
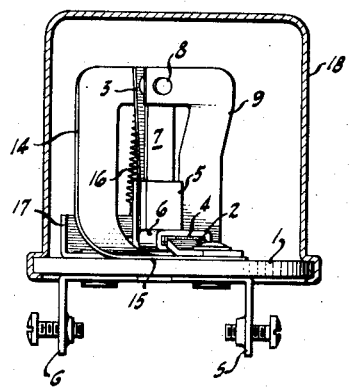
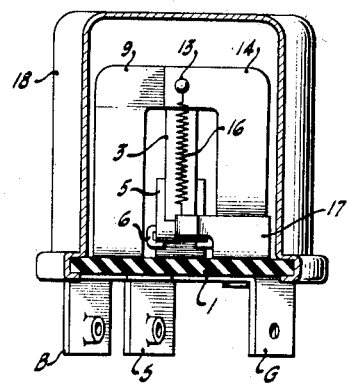
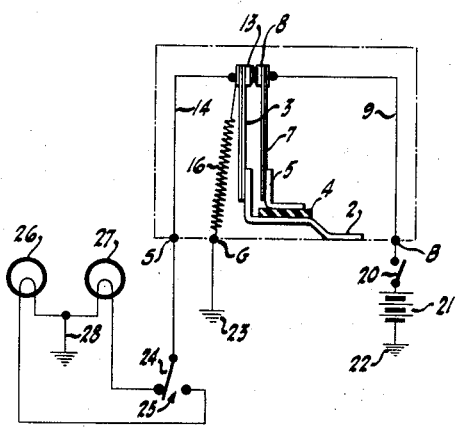
INVENTOR.
DAN FINCH
BY
ATTORNEYS

United States Patent Office 2,897,318
Patented July 28, 1959

2,897,318
THERMOSTATIC SWITCH
Dan Finch, Berkeley, Calif.

Application July 16, 1956, Serial No. 597,919

4 Claims. (Cl. 200—122)

This invention relates to a thermostatic switch, and in general has for its object the provision of a pusating switch having a substantially constant period and which is particularly suitable for controlling the flashing turning light signals of automotive vehicles.

Various statutes and motor vehicle codes presently require that the cyling of flashing turning-signaling lights be maintained within the limits of from 60 to 120 cycles per minute, normally 90 cycles per minute being considered as preferable. Passenger cars use a total of four such lights, two on the front end of the car and two on the rear end thereof. On a car and trailer combination, six lights are used, and on a truck semi-trailer and trailer combination, eight lights are used. When stopped for emergency purposes, such as for changing tires, it is desirable that all of such flashing signaling lights be placed in operation. This means that the signaling circuit of a car and/or car and trailer combination should be such that it can adequately take care of a total of from four to eight lamps flashing on and off at a constant rate of from 60 to 120 cycles per minute.

Although there are many pulsating thermostatic switches available for controlling the signaling lights of vehicles, the circuits of most of them include one or more bimetallic elements and the resistance so introduced in the circuit results in a substantial variation in their cycle of operation.

More specifically, the object of this invention is the provision of a pulsating switch wherein the contacting members thereof are carried by a pair of juxtaposed bimetallic elements, one of which is heated when said members are in contact, wherein neither of said elements is included in the switch circuit, wherein the heated element merely serves as a thermal motor for translating its associated contacting member into and out of engagement with the other contacting member, and wherein the other bimetallic element is under the influence of the ambient temperature and merely serves to compensate for variations in such temperature.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claims may be embodied in other forms.

Referring to the drawings:

Fig. 1 is a top plan view of a switch embodying the objects of my invention with its casing broken away to better illustrate its construction and operation.

Fig. 2 is a vertical section taken on the section line 2—2 of Fig. 1.

Fig. 3 is a side elevation of the switch but with its casing broken away.

Fig. 4 is a vertical section taken on the section line 4—4 of Fig. 1.

Fig. 5 is a diagrammatic view of the switch shown operatively connected in a motor vehicle turning-signaling circuit.

The switch illustrated in these various figures includes a frame-supporting member or base in the form of an insulating disc 1. Mounted on the lower face of the disc and extending therethrough is a battery terminal B, a signal terminal S, and a ground terminal G.

Mounted on the upper face of the disc 1 and connected with the upper end of the terminal S is an L-shaped metal bracket 2. Secured to the upperly extending free leg of the bracket 2 is a thermal motor or bimetal finger or element 3. Accommodated within the interior angle of the bracket 2 is a strip or sheet 4 of insulating material, and seated thereon is a metal angle 5. Formed integral with the horizontal portion of the angle 5 are lateral extensions 6 bent downwardly and inwardly around the bracket 2 and serving to rigidly clamp the angle 5 and insulating sheet 4 to the bracket.

Secured to and supported by the angle 5 is an upwardly extending bimetallic finger or element 7 connected at its upper end by a contacting button or element 8 to the upper end of a flexible conductor 9 made of copper or other material of low resistance, and here shown in the form of a coppr strip of sheet. The lower end of the conductor 9 terminates in a foot 11 and is connected to the battery terminal B.

Similarly connected to and supported by the bracket 2 is an upstanding flexible conductor 12 juxtaposed relative to the bimetallic element 7 provided at its upper end with a contact button or member 13 in alignment with and arranged to periodically contact the contact element 8 and terminating at its lower end in a foot 15 connected to the signal terminal S.

Connected to the outer end of the contact button or member 13 is the upper end of a heater or resistance or heating element 16 in heat transfer relation with the bimetallic element 3 and connected at its lower end to a metallic bracket 17, in turn connected to the upper end of the ground terminal G.

Crimped over the supporting disc 1 and extending over the mechanism above described is an aluminum cylindrical housing or casing 18.

As above stated, the switch above described is particularl designed as shown in Fig. 5 for use in the turning-signaling circuit of an automotive vehicle. When so used the battery terminal is connected through the ignition switch 20 of the vehicle to the positive side of a battery 21, the negative side of the battery being grounded as at 22 by connecting it with the frame of the vehicle or to the ground terminal B of the switch which, as indicated in Fig. 5, is grounded as at 23 by connecting it to the vehicle frame. The terminal S of the switch is connected with the common leg 24 of a two-way, hand-operated signaling switch 25 mounted on the vehicle and by which the terminal S can be selectively connected with either the left hand signaling lamps 26 of the vehicle or with the right hand lamps 27 thereof, the circuit being completed by the ground connection 28 running to the frame of the vehicle.

Operation of switch and circuit

Preliminarily, it should be observed that as used in the circuit herein disclosed, the contact members 8 and 13 are normally closed and that the bimetallic element 3 warps outwardly under the influence of an increase in temperature to move the contact member 13 away from the contact member 8 to thereby open the switch circuit. The bimetallic element 7, being subject only to the ambient temperature, merely serves to compensate for variations in such temperature. It should also here be noted that the pulsating switch can be placed in operation only when the ignition switch 20 is closed, and that when the switch 20 is closed, the pulsating switch will continue to pulsate although the signal lamps 26 and 27 will be selectively energized only if the hand signal switch 25 is closed in one or the other of its two closed positions.

If the ignition switch 20 is closed, the switch leg 24 is in its left hand position as shown in Fig. 5, and the contact member 13 is closed on the contact member 8, then current will flow from the battery terminal B through the contact members 8 and 13, and through the lamp 27 to ground. Simultaneously, current will flow through the heating element 16, to and through the terminal G to ground 23. Due to the heat exchange between the heating element 16 and the bimetallic element 3, the latter element will warp outwardly, thereby causing the contact element 13 to move away from the contact element 8, and then break the circuit at this point. The heating element 16 then immediately cools, and as a result of this, the bimetallic element 3 warps back to its original position to thereby again close the contact member 13 against the contact member 8. In this fashion, the switch continues to pulsate so long as the ignition switch is closed, and either of the lamps 26 or 27 can be made to correspondingly pulsate, depending upon the position of the switch leg 24. Since the current at no time passes through either of the bimetallic elements, the resistance of the circuit is maintained substantially constant, and consequently, the cycle of the switch can be maintained substantially constant. Furthermore, by means of this type of switch it is possible to simultaneously operate as many as six 21-candle power lamps, a feature which is extremely convenient when, for example, it is desired to change a tire of a truck and trailer combination on the highway, or when for any other reason it becomes necessary to park on the highway.

Since in this structure the heating coil 16 is adjacent to but does not surround the bimetallic element 3, the latter can be cooled far more quickly than would be the case if the heating coil were to surround the bimetallic element. This in turn means that the cycle of the switch can be carried over a greater range of frequencies than could otherwise be the case. Furthermore by resorting to this expedient the ratio of the on to off time of the switch can be controlled more precisely.

I claim:

1. A thermostatic switch comprising: a supporting member; a first contact member supported by said supporting member; a bimetallic element supported by said supporting member; a second contact member carried by said bimetallic element and arranged to be brought into and out of contact with said first contact member in response to movement of said bimetallic element; a first lead connected to one of said contact members and arranged to communicate with a source of voltage; a second lead connected to the other of said contact members and arranged to be grounded through a translating device; and a non-thermally insulated resistance element having a low thermal heat capacity connected at one end to said second contact member and arranged to communicate with ground at its other end.

2. A thermostatic switch comprising: a supporting member; first and second juxtaposed bimetallic elements supported by said supporting members; first and second contact members mounted respectively on said first and second bimetallic elements and arranged to move into and out of contact with, and from each other in response to relative movement between said bimetallic elements; first and second leads connected respectively with said first and second contact members, one of said leads being arranged to be connected with a source of voltage and the other of said leads being arranged to communicate with one side of a translating device; and a heating element in heat transfer relationship with one only of said bimetallic elements and connected at one end thereof to the contact member of said bimetallic element.

3. A thermostatic switch comprising: a base member; a metal bracket mounted on said base and communicating with a first terminal mounted thereon; first and second juxtaposed bimetallic fingers mounted on said bracket, said second finger being insulated from said first finger and from said bracket; opposed contact members mounted on the free ends of said fingers and arranged to be brought into and out of contact with each other in response to relative movement between said fingers; a first flexible conductor shunted between said bracket and the contact member of said first finger; a second flexible conductor establishing communication between the other of said contact members and a second terminal carried by said base; and a heating element juxtaposed with said first finger, one end of said heating element being connected with the contact member of said first finger and its other end being connected to a third terminal carried by said base, the resistance of said first flexible conductor being substantially less than the resistance of said first finger.

4. A switch comprising: a supporting member; first and second bimetallic elements, each anchored at one of its ends to said supporting member, the other ends of said bimetallic elements being juxtaposed for movement into and out of contact with each other; leads connecting with the juxtaposed ends of said bimetallic elements, said leads having a substantially lower resistance than the resistance of said bimetallic elements; and means for heating only one of said bimetallic elements during the intervals that the juxtaposed ends of said bimetallic elements are closed on each other.

References Cited in the file of this patent

UNITED STATES PATENTS

| | | |
|---|---|---|
| 1,562,932 | Walker | Nov. 24, 1925 |
| 1,602,088 | Shoenberg et al. | Oct. 5, 1926 |
| 1,661,103 | Appelberg | Feb. 28, 1928 |
| 1,955,076 | Ludwig | Apr. 17, 1934 |
| 2,280,960 | Lee | Apr. 28, 1942 |
| 2,295,202 | Davis | Sept. 8, 1942 |
| 2,442,445 | Toelle | June 1, 1948 |
| 2,563,341 | Kettering | Aug. 7, 1951 |
| 2,623,137 | Vogelsberg | Dec. 23, 1952 |
| 2,667,550 | Lituchy | Jan. 26, 1954 |
| 2,745,042 | Hoff | May 8, 1956 |
| 2,748,222 | DeLancey | May 29, 1956 |
| 2,764,650 | Hodson | Sept. 25, 1956 |
| 2,838,633 | Lakatos et al. | June 10, 1958 |

FOREIGN PATENTS

| | | |
|---|---|---|
| 538,203 | Italy | Jan. 19, 1956 |